(12) United States Patent
Reich

(10) Patent No.: US 9,206,933 B2
(45) Date of Patent: Dec. 8, 2015

(54) CONNECTION DEVICE FOR A SUPPLY LINE

(75) Inventor: Reinhard Reich, Hollenbach (DE)

(73) Assignee: Bauer Maschinen GmbH, Schrobenhausen (DE)

(*) Notice: Subject to any disclaimer, the term of this patent is extended or adjusted under 35 U.S.C. 154(b) by 753 days.

(21) Appl. No.: 13/536,490

(22) Filed: Jun. 28, 2012

(65) Prior Publication Data
US 2013/0001941 A1    Jan. 3, 2013

(30) Foreign Application Priority Data
Jun. 28, 2011    (EP) .................................... 11005270

(51) Int. Cl.
| | |
|---|---|
| *E21B 41/04* | (2006.01) |
| *F16L 39/00* | (2006.01) |
| *F16L 1/26* | (2006.01) |
| *F16L 37/00* | (2006.01) |
| *H01R 13/523* | (2006.01) |

(52) U.S. Cl.
CPC . *F16L 39/00* (2013.01); *F16L 1/26* (2013.01); *F16L 37/002* (2013.01); *H01R 13/523* (2013.01)

(58) Field of Classification Search
CPC .............. F16L 1/26; F16L 37/002; F16L 9/00
USPC ............. 285/920, 123.9, 103, 325, 27–29, 1, 285/406, 320, 405, 403, 420, 24, 25, 285/137.11, 237; 166/363, 338–349
See application file for complete search history.

(56) References Cited

U.S. PATENT DOCUMENTS

| | | | |
|---|---|---|---|
| 3,635,184 A | 1/1972 | Liautaud | |
| 3,990,644 A | 11/1976 | Hanke et al. | |
| 4,075,862 A | 2/1978 | Ames | |
| 4,192,383 A * | 3/1980 | Kirkland et al. ............... | 166/341 |
| 4,515,399 A | 5/1985 | Sullivan et al. | |
| 5,295,848 A * | 3/1994 | Mohn ........................... | 439/247 |
| 2006/0079107 A1 | 4/2006 | Allensworth et al. | |
| 2007/0269270 A1 | 11/2007 | Bastesen et al. | |
| 2008/0090445 A1 | 4/2008 | Luzbetak et al. | |
| 2009/0058076 A1 | 3/2009 | Giles et al. | |
| 2010/0038899 A1 | 2/2010 | Clover et al. | |

FOREIGN PATENT DOCUMENTS

| | | |
|---|---|---|
| CA | 2733515 A1 | 2/2010 |
| CN | 101588827 A | 11/2009 |
| JP | S51-31956 A | 3/1976 |
| WO | 84/02565 A1 | 7/1984 |

OTHER PUBLICATIONS

European Search Report; EP11005270; Nov. 16, 2011.

* cited by examiner

*Primary Examiner* — Michael P Ferguson
*Assistant Examiner* — Jay R Ripley
(74) *Attorney, Agent, or Firm* — Studebaker & Brackett PC

(57) ABSTRACT

The invention relates to a connection device for a supply line with a jacket pipe and at least two inner lines arranged therein, wherein a housing with a first connection region for the jacket pipe and a second connection region for the inner lines is provided. According to the invention the first connection region comprises at least one holding element which is mounted, for the purpose of holding or releasing the jacket pipe, so that it can be radially fed thereto or returned therefrom. The second connection region is arranged axially spaced apart from the first connection region and comprises axially actuated plug connection elements for the inner lines.

7 Claims, 6 Drawing Sheets

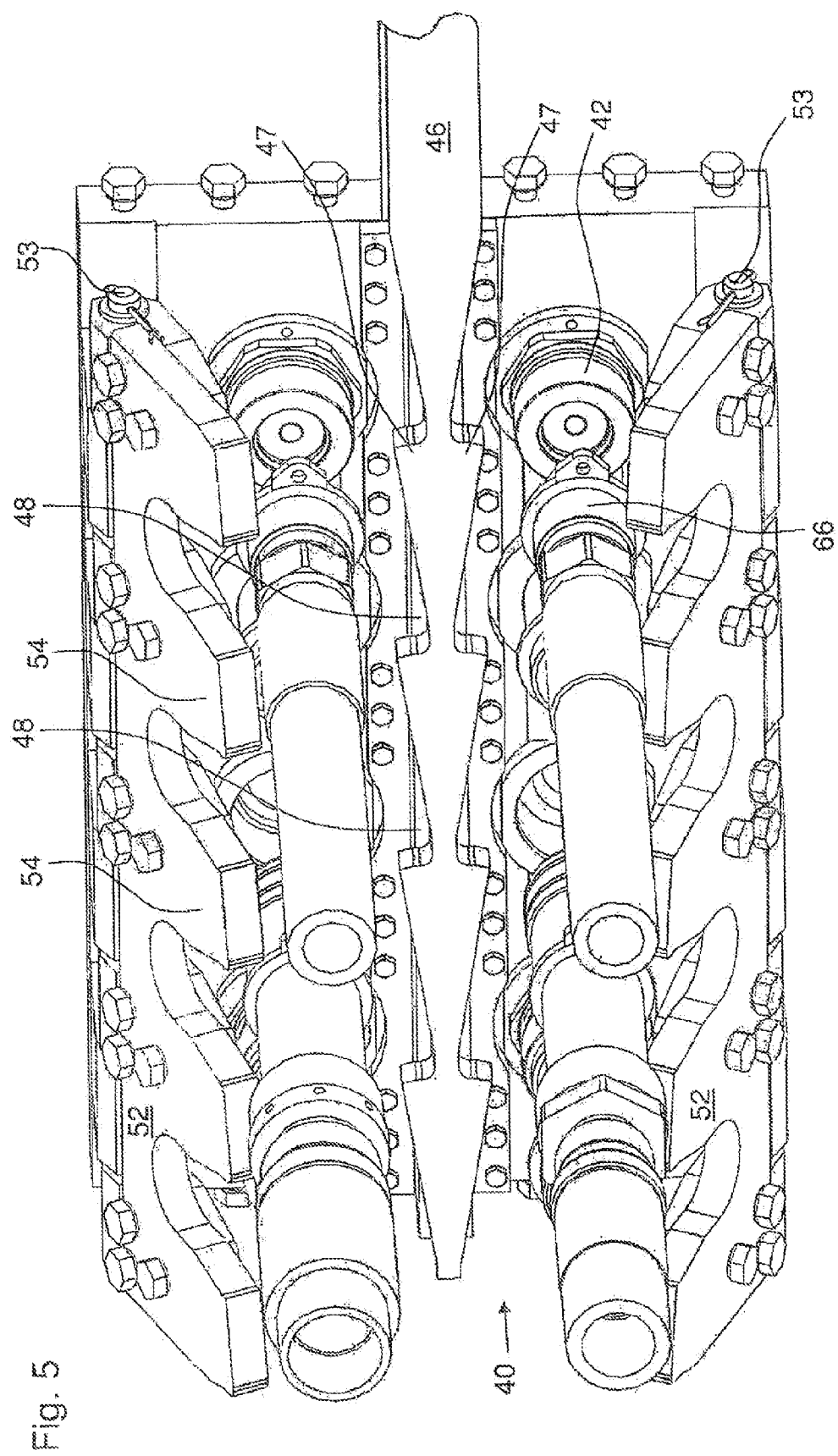

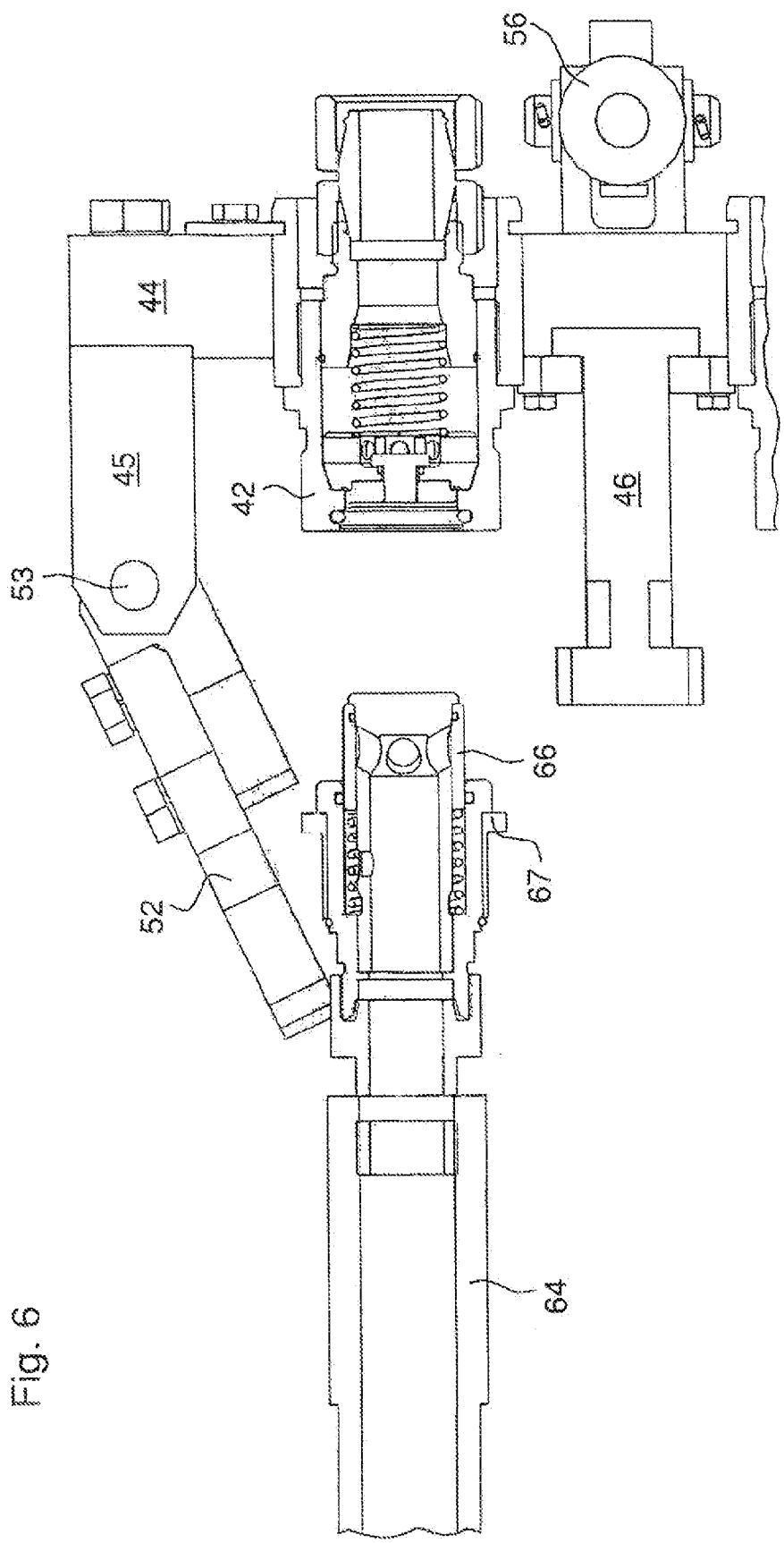

CONNECTION DEVICE FOR A SUPPLY LINE

BACKGROUND OF THE INVENTION

1. Field of the Invention

The invention relates to a connection device for a supply line with a jacket pipe and at least two inner lines arranged therein, wherein a housing with a first connection region for the jacket pipe and a second connection region for the inner lines is provided.

2. Description of Related Art

Such supply lines serve for example for the connection of underwater units to supply vessels. By means of the supply line in particular energy, data and various fluids are fed to the underwater unit so that it can work in the desired way for example at the bottom of the sea or a lake. Such a supply line comprises various lines within a jacket pipe corresponding to the supply to be provided.

Precisely at sea, however, it is repeatedly necessary to cut off the supply line in the short term, for example if made necessary by high waves or a storm. If this does not take place or does not take place punctually there is the risk of undesirable forces being transferred via the supply line to the underwater unit, through which the security and functioning capacity thereof can be impaired. There is also a risk of an uncontrolled tearing away of the supply line, meaning that restoration of the connection is not possible or is only possible with considerable expense.

A generic connection device is known for example from U.S. Pat. No. 5,295,848. At the end of a supply pipe a sleeve-form plug and socket device is provided, through which an outer sleeve can be axially inserted into a corresponding receiving socket. Axial connections are mounted so that they can be moved in the axial direction within the sleeve in order to allow for the purpose of connection initially the connection of the inner lines before the outer jacket pipe can be fixed.

In this known connection device there is thus a connection of the inner lines at a time at which the outer jacket pipe has not yet been mechanically fixed. In case of rough seas the connected inner lines can tear away, for example due to uncontrolled movements of the supply vessel, if the jacket pipe has not yet been fixed. In addition a release of the supply line in certain emergency situations is not possible very quickly as initially the connection of the surrounding jacket pipe must be released and only then is a release of the axial plug connections of the inner lines possible.

BRIEF SUMMARY OF THE INVENTION

It is the object of the invention to provide a connection device for a supply line which allows on the one hand a reliable and secure connection and nonetheless rapid release.

The object is achieved according to the invention through a connection device having the features of claim 1. Preferred embodiments are indicated in the dependent claims.

The connection device according to the invention is characterised in that the first connection region comprises at least one holding element which is mounted, for the purpose of holding or releasing the jacket pipe, so that it can be radially fed thereto or returned therefrom and in that the second connection region is arranged axially spaced apart from the first connection region and comprises axially actuated plug connection elements for the inner lines.

According to a first aspect of the invention a radially adjustable holding element is provided to connect the jacket pipe. The jacket pipe absorbs the essential mechanical forces of the supply line. While in case of an axial connection with possible high mechanical transverse forces jamming could arise, a radially adjustable holding element can be easily fed or returned even in case of high mechanical stresses being present on the jacket pipe. This allows in particular in emergencies a rapid and reliable mechanical release of the jacket pipe of the supply line.

According to a further aspect of the invention the first connection region for connecting the jacket pipe is arranged axially spaced apart from the second connection region for the axial plug connection elements of the inner lines. In this way it is possible for initially the outer jacket pipe to be connected. If this mechanically stable connection has been produced, in the spaced apart second connection region the inner lines projecting from the jacket pipe can be securely connected or released. In this way it is ensured that vigorous movements of a supply vessel do not lead to tearing away of inner hydraulic lines and hydraulic fluid thus leaking out uncontrollably. In addition through the inventive arrangement there is adequate space for arranging the plug connection elements so that these can be easily and reliably operated by users.

Through the inventive connection device a secure connection and release of a maritime supply line is thus possible in particular with rough high sea conditions.

According to a preferred embodiment of the invention two plate-form holding elements are provided which are mounted so that they can be displaced on opposing sides of the jacket pipe. With such plate-form holding elements the jacket pipe can be clamped reliably on the first connection region. By simply moving back the holding elements a rapid and secure release of the connection is possible even in the presence of great tension.

In principle the displacement of the plate-form holding elements can take place by hand. It is particularly advantageous according to the invention that the at least one holding element can be actuated by means of an operating cylinder. The operating cylinder is thereby preferably a hydraulic cylinder which is controlled by means of a corresponding control means.

It is further preferred according to the invention for a reliable connection that the plug connection elements are arranged on a connecting plate one beside the other in at least one row. The arrangement can also comprise in particular two or more rows. This allows a space saving compact arrangement, but wherein good accessibility continues to be ensured for operators.

The individual plug connection elements for the inner lines are inserted in principle by hand into corresponding counter elements on the second connection region. Release can take place in the same way by hand. However, it is advantageous for a particularly rapid release according to the invention that a release means is provided for the joint release of the inner lines from the plug connection elements. This release means can for example actively pull the corresponding plugs of the inner lines out of the plug connection elements. For certain rapid hydraulic couplings the release movement can also consist in that the plugs of the inner lines are moved in the direction towards the plug elements, whereby the plugs then disengage from the plug connection elements and are released. The release means can carry out the corresponding release movement according to the type of the plug connection element. Through a simultaneous joint release of the plug connection elements a rapid and controlled cutting off of the supply line is achieved in particular in emergency situations.

It is thereby particularly preferable according to the invention that the release means comprises at least a release plate with actuating cams which in part include plug elements of the inner lines for an axial actuation. Radial projections or collars can be provided for this purpose on the plug elements which come into contact with the release plate for application of an axial release movement. The release plate can be formed for example like a comb, wherein the teeth of the comb form the actuating cams.

A release according to the invention can be achieved particularly reliably in that the release means can be actuated by means of an operating cylinder. This operating cylinder is preferably likewise a hydraulic cylinder.

For controlled cutting off it is advantageous according to the invention that a control means is provided, through which the at least one holding element for the jacket pipe and the release means for the inner lines can be actuated orientated to each other. It is thereby preferable that the release of the inner lines takes place before or at least simultaneously with the release of the jacket pipe. In this way excessive mechanical loads are prevented from being transferred to the sensitive electric, electronic or hydraulic plug elements or couplings.

In principle the most varied lines can be provided for the inner lines. It is preferable according to the invention that the inner lines comprise power cables, data cables and/or fluid pipes. The fluid pipes can be hydraulic or pneumatic pipes. Supply pipes for water, air or other liquids and gases are also possible.

According to a further preferred embodiment of the invention the housing comprises an outer plate, on which the first connection region for the jacket pipe is provided, the outer plate comprises a passage opening, through which the inner lines can be fed into the housing to the second connection region and a guide funnel is arranged between the outer plate and the second connection region, said guide funnel tapering towards the passage opening.

With this arrangement the inner lines can be arranged very compactly within the jacket pipe which can for example be a feed pipe which is known in construction machines and in particular slotted wall milling cutters. In order to actuate the individual plug connections the inner lines can branch out after leaving the jacket pipe so that there is sufficient space for use on the second connection region. In order to ensure in case of controlled cutting a secure passage of the plug connectors through the passage opening of the connection plate a guide funnel is provided. This guide funnel is arranged at the passage opening and widens towards the second connection region.

It is furthermore preferred according to the invention that guide bars are arranged between the connection plate and a connecting plate of the second connection region. These guide bars serve in the same way as the guide funnel for controlled channelling of the inner lines through the passage opening in case of controlled cutting off of the supply line.

BRIEF DESCRIPTION OF DRAWINGS

The invention is explained in further detail by reference to example embodiments which are shown schematically in the drawings, in which:

FIG. 5 a detailed view of the second connection region in the open state;

FIG. 6 a schematic cross-sectional view of the second connection region in the open state.

DETAILED DESCRIPTION OF THE INVENTION

Figure 1:
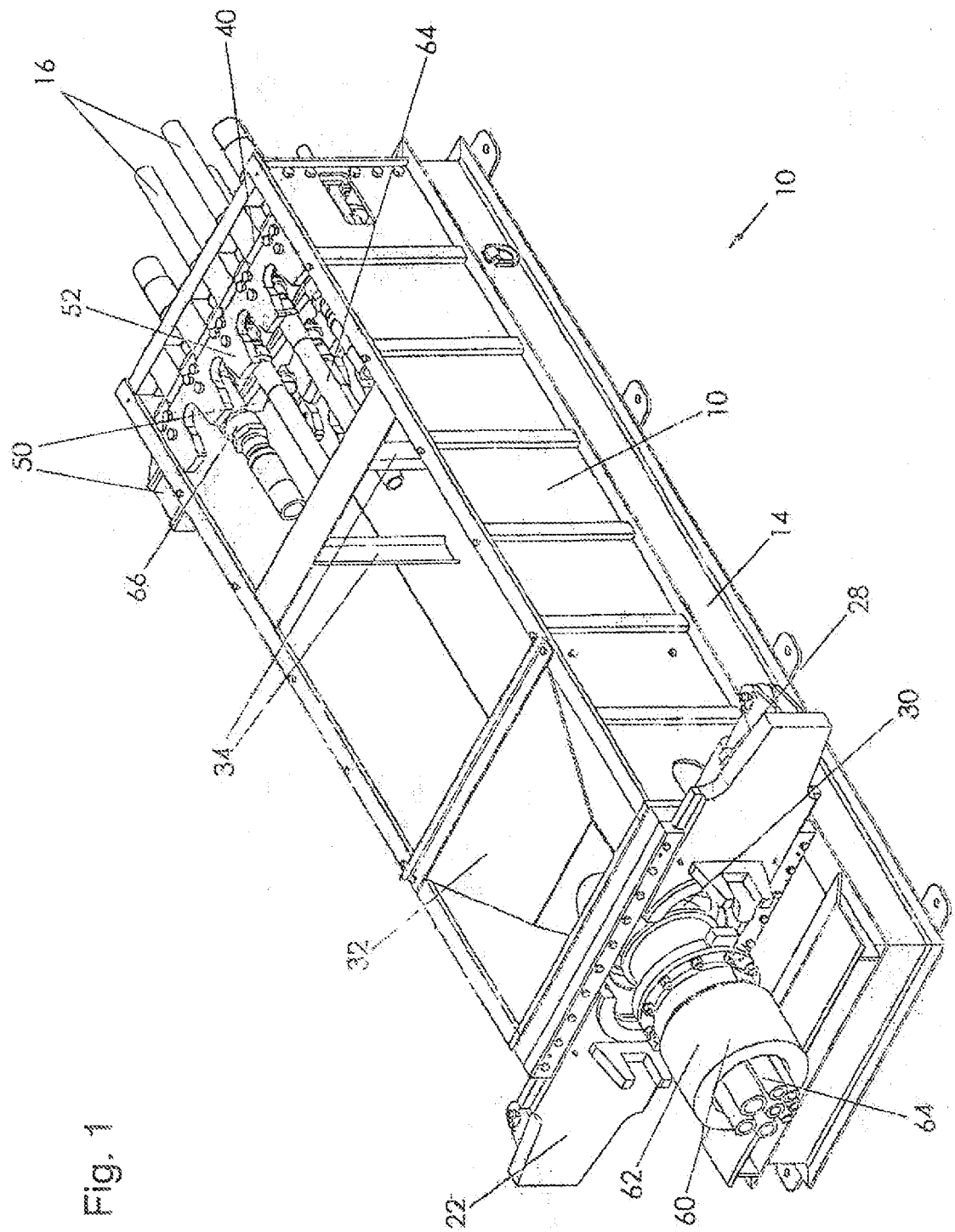
FIG. 1 shows a perspective partially sectional view of an inventive connection device.

An embodiment of an inventive connection device 10 is shown in an overview in the partially sectional, perspective view of FIG. 1. The connection device 10 comprises a box-form housing 12 which is fixed on a base frame 14 consisting of steel supports. The base frame 14 can be fixedly connected to a supply vessel.

The connection device 10 serves for the releasable connection of a supply line 60 with an outer jacket pipe 62 and inner lines 64 arranged therein which are to be releasably connected to corresponding stationary lines. In this way by means of the stationary lines 16 a connection can be carried out from the supply vessel via the supply line 60 for example to an underwater unit.

The connection device 10 thereby comprises on its front side a first connection region 20 for the outer jacket pipe 62. In this connection the housing 12 comprises a front outer plate 24, on which guide rails 26 are provided at the top and bottom for the linear guidance of two opposing plate-form holding elements 22. The holding elements 22 can be linearly displaced via operating cylinders 28 between the open position (as shown) and a closed position for holding the jacket pipe 62. The structure and functioning are described in greater detail below by reference to FIGS. 2 and 3.

The inner lines 64 which can be data cables, electric cables, lines for hydraulic liquid, air or other fluids extend beyond the end of the jacket pipe 62 through a passage opening 30 in the outer plate 24 into the housing 12 of the connection device 10. The inner lines 64 which are shown partially sectionally in FIG. 1 extend as far as a rear-side second connection region 40, onto which the stationary lines 16 run. Plug elements 66 are arranged at the ends of the inner lines 64 which are formed in a fitting manner to corresponding plug connection elements on the second connection region 40 for production of a line connection.

For rapid release of these line connections a release means 50 is provided which comprises according to the embodiment shown two pivotably arranged comb-like release plates 52. The structure and functioning of the release means 50 are explained in greater detail below in connection with FIGS. 4 to 6.

In the released or open position shown in FIG. 1 of the connection device 10 the connecting line 60 can be easily removed from the housing 12. In order to prevent snagging of the inner lines 64 within the housing 12 plate-form guide bars 34 and a guide funnel 32 are arranged in the housing 12, whereby said guide funnel 32 tapers from the inner space of the housing 12 towards the passage opening 30 in the outer plate 25.

Figure 2:
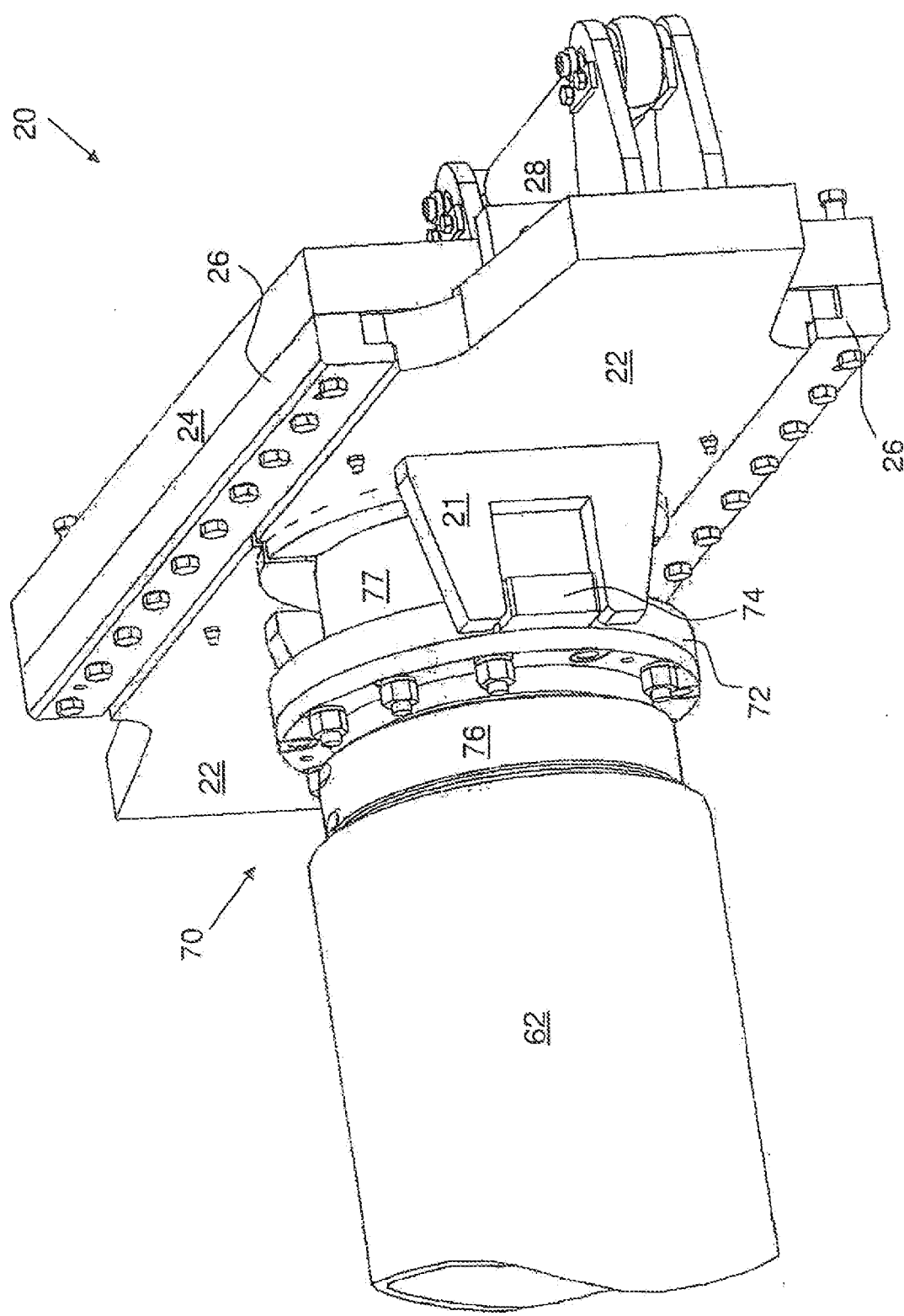
FIG. 2 a detailed view of the first connection region in the closed state.
Figure 3:
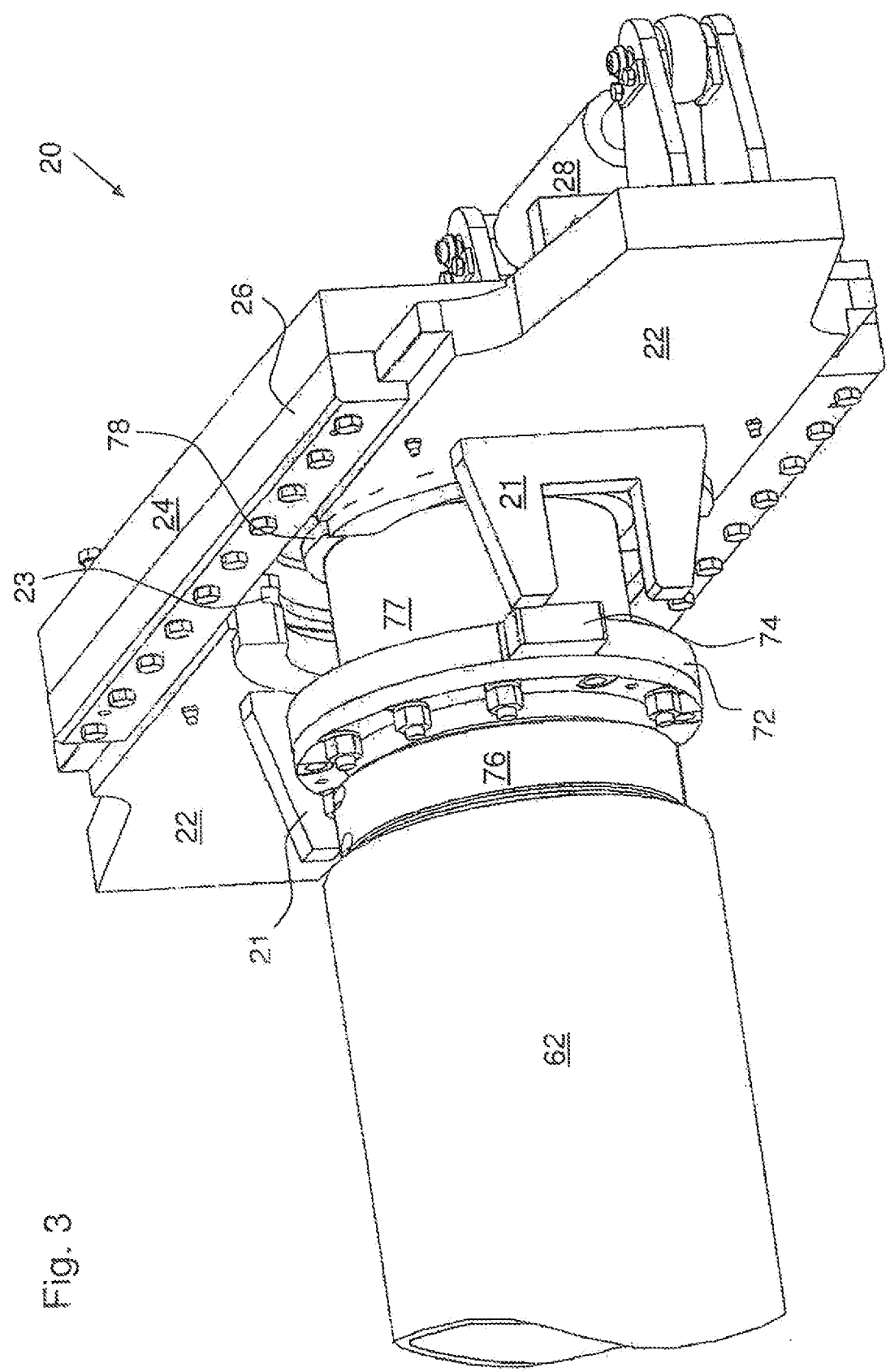
FIG. 3 a detailed view of the first connection region in the open state.

The structure and functioning of the first connection region 20 for connection of the outer jacket pipe 62 can be derived in greater detail from FIGS. 2 and 3. At the end of the jacket pipe 62 a pipe connector 70 is arranged. The flexible pipe region is fixedly connected to a sleeve-form shaft 76, to which a centring ring 72 connects. On the outer side of the centring ring 72 two opposing centring pins 74 are arranged which project radially.

In the closed position of the connection region 20 shown in FIG. 2 the centring pin 74 projects into a plate-form centring mount 21 which projects perpendicularly from a front side of the plate-form holding element 22. In this way the centring pin 74 engaging in the centring mount 21 forms an anti-rotation means for the jacket pipe 62.

An end sleeve 77 of the pipe connector 70 connects to the front to the centring ring 72, whereby an annular collar 78 projects radially outwards at the free end of the end sleeve 77, as follows from the open position according to FIG. 3. In this position according to FIG. 3 the jacket pipe 62 can be pushed axially as far as a stop (not shown) onto the first connection region 20.

By moving in the operating cylinders 28 the two plate-form holding elements 22 are moved axially relative to each other. The holding elements 22 are thereby linearly guided on their upper side and lower side in guide bars 26 which are fixed in turn on the outer plate 24 of the housing 12.

Through this axial pushing together of the holding elements 22 the annular collar 78 of the pipe connector 70 engages in an annular groove 23 on the arcuate inner sides of the holding elements 22. This results in a shape locking axial position securing of the jacket pipe 62 in the connection device 10. At the same time the plate-form centring mounts 21 are pushed with their U-like recess over the radially outwardly projecting centring pins 74 in order to thus guarantee an anti-rotation measure for the jacket pipe 62.

All in all a reliable, mechanically stable connection of the jacket pipe 62 on the connection device 10 is guaranteed through the first connection region 20.

The design of the second connection region 40 is explained below in connection with FIGS. 4 to 6. The second connection region 40 comprises a connecting plate 44 forming the rear side of the housing 12. The stationary lines 16 run onto said connecting plate 44 in plug connection elements 42 which project into the inner space of the housing 12. At the ends of the inner lines 64 corresponding plug elements 66 are formed in order to produce a corresponding line connection through axial insertion.

Figure 4:
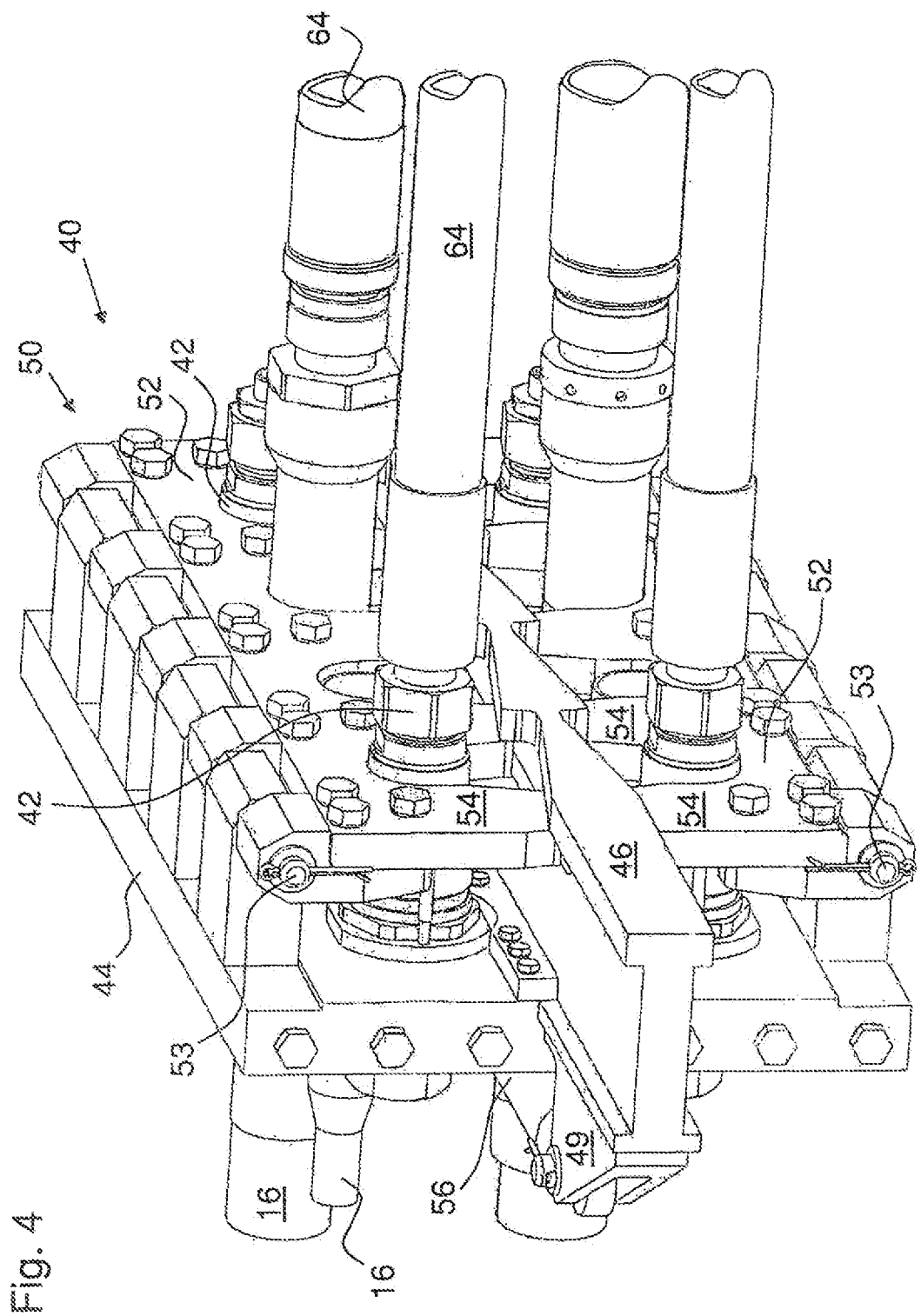
FIG. 4 a detailed view of the second connection region in the closed state.

FIG. 4 shows the second connection region 40 in the closed position, thus with connected inner lines 64. The plug connection elements 42 are thereby arranged in two rows one over the other on the connecting plate 44. In order to hold the plug elements 66 in the plug connection elements 42 two comb-like release plates 52 of a release means 40 are pivoted about their respective pivot axis 53 into their locked position, in which the release plates 52 are arranged approximately parallel to the connecting plate 44.

According to FIG. 4 the two release plates 52 are locked in their closed position by means of a locking bar 46. The locking bar 46 is mounted so as to be linearly displaceable on the connecting plate 44 parallel thereto and transversely relative to the plug connection elements 42. For linear displacement an operating cylinder 56 is arranged on the rear side of the connecting plate 44 which is connected by means of a bearing block 49 to the locking bar 46.

As can be seen particularly clearly from FIG. 5, the locking bar 46 comprises holding surfaces 47 lying at the top and bottom which go like a saw tooth into release recesses 48. In the closed position according to FIG. 4 the holding surfaces 47 of the locking bar 46 are arranged so that the release plates 52 are prevented from pivoting forwards about their pivot axes 53. In this locked position the plug elements 66 on the inner lines 64 are held in a shape locking way in the associated plug connection elements 42 so that a line connection is reliably guaranteed.

By moving out the operating cylinder 56 the locking bar 46 is displaced so that the comb-like actuating cams 54 of the release plate 52 can pivot freely upwardly and downwardly through the release recesses 48. The pivot movement of the release plates 52 can be achieved through a separate operating cylinder, a separate tension spring or through spring tension elements in the plug connection elements 42 and/or the plug elements 66 themselves.

As can be seen more closely in particular from FIG. 6, through the free pivoting of the release plates 52 about the pivot axis 53 the shape locking axial position fixing of the plug elements 66 with their radially outwardly projecting projections 67 is released so that the inner lines 64 can be axially removed. For stable mounting of the pivot plate 52 a plurality of bearing sockets 45 are arranged spaced apart from each other on the connecting plate 44, through which bearing sockets 45 the pivot axis 53 of the release means 50 projects.

The invention claimed is:

1. A connection device for a supply line with a jacket pipe extending in a longitudinal direction and at least two inner lines arranged in the jacket pipe, said connection device comprising:

a housing with a first connection region adapted to be connected to the jacket pipe and a second connection region adapted to be connected to the inner lines, wherein the first connection region comprises two plate-form holding elements provided at opposite sides of the jacket pipe in the radial direction such that the two plate-form holding elements are displaceable from opposing sides of the jacket pipe in the radial direction orthogonal to the longitudinal direction for holding and releasing the jacket pipe, the two plate-form holding elements provided on an a plate of the housing between first and second guide rails attached to the plate for the linear guidance of two opposing plate-form holding elements, the plate comprises a passage opening, through which the inner lines are fed into the housing to the second connection region, and wherein the second connection region is arranged spaced apart from the first connection region in the longitudinal direction and comprises axially actuated plug connection elements adapted to connect with the inner lines, wherein release means for joint release of the inner lines from the plug connection elements is provided, the release means comprising at least one release plate with actuating cams, said release means pivots between a closed position and a release position where the actuating cams are engaged with plug elements of the inner lines when the release plate is in the closed position.

2. The connection device according to claim 1, wherein the at least one holding element is actuated by means of an operating cylinder.

3. The connection device according to claim 1, wherein the plug connection elements are arranged on a connecting plate one beside the other in at least one row.

4. The connection device according to claim 1, wherein the release means is actuated by means of an operating cylinder.

5. The connection device according to claim 1, wherein control means is provided, through which the at least one holding element for the jacket pipe and the release means for the inner lines are actuated.

6. The connection device according to claim 1, wherein the housing comprises
a guide funnel arranged between the plate and the second connection region, which guide funnel tapers towards the passage opening.

7. The connection device according to claim 6, wherein guide bars are arranged between the plate and a connecting plate of the second connection region.

* * * * *